US007013372B2

(12) United States Patent
Achiwa et al.

(10) Patent No.: US 7,013,372 B2
(45) Date of Patent: Mar. 14, 2006

(54) METHOD FOR CONTROLLING INFORMATION PROCESSING SYSTEM, INFORMATION PROCESSING SYSTEM AND INFORMATION PROCESSING PROGRAM

(75) Inventors: Kyosuke Achiwa, Odawara (JP); Masafumi Nozawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 10/637,920

(22) Filed: Aug. 7, 2003

(65) Prior Publication Data

US 2004/0153719 A1  Aug. 5, 2004

(30) Foreign Application Priority Data

Dec. 26, 2002 (JP) ............................. 2002-376856

(51) Int. Cl.
*G06F 12/16* (2006.01)
*G06F 11/00* (2006.01)
(52) U.S. Cl. ......................................... 711/162; 714/7
(58) Field of Classification Search ................ 711/162, 711/114, 170; 714/5–7; 709/217, 221, 224; 710/15; 713/100
See application file for complete search history.

(56) References Cited

U.S. PATENT DOCUMENTS 5,742,792 A  4/1998 Yanai et al.
6,681,303 B1 *  1/2004 Watanabe et al. ........... 711/162
2003/0009707 A1  1/2003 Pedone et al.
2003/0051111 A1  3/2003 Nakano et al.
2003/0177321 A1  9/2003 Watanabe
2003/0182592 A1  9/2003 Massa et al.
2003/0188218 A1  10/2003 Lubbers et al.
2003/0188233 A1 *  10/2003 Lubbers et al. ............. 714/100
2004/0123180 A1  6/2004 Soejima et al.
2004/0128442 A1  7/2004 Hinshaw et al.

\* cited by examiner

*Primary Examiner*—Denise Tran
(74) *Attorney, Agent, or Firm*—Mattingly, Stanger, Malur & Brundidge, P.C.

(57) ABSTRACT

An information processing system includes three storage apparatuses installed on three sites for the purpose of disaster recovery. The three storage apparatuses can be accessed by three information processing apparatuses, respectively, that are configured in a cluster. One of the storage apparatuses is set as a replication source and the other two storage apparatuses are set as replication destinations. The two storage apparatuses that are set as replication destinations manage a copy of data stored in the storage apparatus that is set as the replication source. In association with an execution of a failover on the information processing apparatus side, settings of the storage apparatuses as the replication source and replication destinations are automatically changed such that the storage apparatus that is set as the replication source function as a replication destination, and one of the storage apparatuses that are set as the replication destinations function as a replication source.

21 Claims, 10 Drawing Sheets

METHOD FOR CONTROLLING INFORMATION PROCESSING SYSTEM, INFORMATION PROCESSING SYSTEM AND INFORMATION PROCESSING PROGRAM

BACKGROUND OF THE INVENTION

1. Field of the Invention

The present invention relates to methods for controlling information processing systems, information processing systems, and information processing programs.

2. Related Background Art

Disaster recovery systems for information processing systems are attracting attention. According to a known technology to realize a disaster recovery system, a copy of data stored in a storage apparatus installed at a primary site is also managed in a storage apparatus installed at a secondary site remotely located from the primary site (hereafter, this technology is referred to as a "remote copy"). In an information processing system in which the remote copy is applied, a storage apparatus that is set as a replication source is normally used as a primary system, and a storage apparatus that is set as a replication destination is normally used as a backup system.

In the meantime, there is a technology that is applicable to an information processing system including a plurality of grouped information processing apparatuses (computers) that are communicatively connected to one another, which can mutually take over operations to improve the availability of the information processing system in the event of disasters; this technology is known as "clustering." Clustering may also be used, besides for the purpose of improving the availability of the information processing system, to distribute the processing load among a plurality of information processing apparatuses.

There is an information processing system that uses a clustering scheme on the side of information processing apparatuses, and a remote copy scheme on the side of storage apparatuses. In such an information processing system, when some failure occurs for example in one of the information processing apparatuses that is installed on a primary site and used as a primary system, the other information processing apparatus installed on a secondary site and used as a backup system would be used as a primary system. In such an instance, the relation between the storage apparatus that is set in the remote copy as a replication source and the storage apparatus that is set as a replication destination need to be changed.

However, in effect, the changing of the relation is conducted manually by an operator who becomes aware of the fact that a failover operation has been executed on the side of the information processing apparatuses. Although the application of the clustering scheme enables a swift and automatic recovery of the system at the time of failover on the side of the information processing apparatuses, the effect of clustering may be weakened as the change of the storage apparatuses needs to depend on manual operations.

SUMMARY OF THE INVENTION

The present invention has been made in view of the drawback described above, and relates to methods for controlling information processing systems, information processing systems, and information processing programs.

In accordance with an embodiment of the present invention, in a method for controlling an information processing system including a first storage apparatus and a first information processing apparatus that accesses the first storage apparatus installed at a first site, a second storage apparatus and a second information processing apparatus that accesses the second storage apparatus installed at a second site, and a third storage apparatus and a third information processing apparatus that accesses the third storage apparatus installed at a third site, wherein the first, second and third information processing apparatuses are mutually communicatively connected; at least two pairs of ones of the first, second and third storage apparatuses are communicatively connected; the first, second and third information processing apparatuses are configured in a cluster and controlled; one of the first, second and third storage apparatuses is set as a replication source storage apparatus, and other two of the storage apparatuses are set as replication destination storage apparatuses. The method controls the information processing system such that, when the replication source storage apparatus stores data in response to a data write request that is sent from one of the information processing apparatuses, the data is sent from the replication source storage apparatus to the two replication destination storage apparatuses, and upon receiving the data, the two replication destination storage apparatuses store the data, such that a copy of the data stored in the replication source storage apparatus is stored in the two other storage apparatuses; and when a failover is executed from one of the first, second and third information processing apparatuses to another of the first, second and third information processing apparatuses, the settings of the first, second and third storage apparatuses as the replication source storage apparatus and replication destination storage apparatuses are automatically changed such that the replication source storage apparatus is switched to serve as a replication destination storage apparatus and one of the two replication destination storage apparatuses is switched to serve as a replication source storage apparatus.

As described above, when the replication source storage apparatus stores data in response to a data write request that is sent from one of the information processing apparatuses, the data is sent from the replication source storage apparatus to the two replication destination storage apparatuses, and upon receiving the data, the two replication destination storage apparatuses store the data, such that a copy of the data stored in the replication source storage apparatus is stored in the two other storage apparatuses. This function is a remote copy function which is described below. In the remote copy function, data written in a replication source can be transferred to a replication destination in a multi-copy mode or a multi-hop mode as described below. Also, a synchronous system or an asynchronous system may be employed depending on differences in the condition in sending a data write completion notice from a storage apparatus set as a replication source to an information processing apparatus when data is written in the storage apparatus set as the replication source. To "set" storage apparatuses as replication source or replication destination can mean, for example, to set information that is stored in each of the storage apparatuses which specifies one of the storage apparatuses as a replication source and other of the storage apparatuses as replication destinations. Also, the "two storage apparatuses that are set as replication destinations" may be storage apparatuses that are installed, for example, at the same site. Also, the control to "automatically change the settings" may be executed, for example, in an event when an instruction is given from the information processing apparatus side.

In accordance with the embodiment of the present invention, for example, the remote copy management configuration on the storage apparatus side can be automatically changed, linked with failover operations at the information processing apparatus side without human intervention.

Other objects, features and advantages of the invention will become apparent from the following detailed description taken in conjunction with the accompanying drawings.

BRIEF DESCRIPTION OF THE DRAWINGS

FIGS. 5A, 5B and 5C are diagrams illustrating management configuration changes that may be executed in association with a failover performed on the information processing apparatus side when a remote copy is conducted in a multi-copy mode in accordance with an embodiment of the present invention, wherein FIGS. 5A, 5B and 5C show different management configurations of remote copy in a multi-copy mode.

FIGS. 7A, 7B and 7C are diagrams illustrating management configuration changes that may be executed in association with a failover performed on the information processing apparatus side when a remote copy is conducted in a multi-hop mode in accordance with an embodiment of the present invention, wherein FIGS. 7A, 7B and 7C show different management configurations of remote copy in a multi-hop mode.

FIGS. 9A, 9B and 9C are diagrams illustrating management configuration changes that may be executed in association with a failover performed on the information processing apparatus side when a remote copy is conducted in a multi-copy mode or a multi-hop mode in accordance with an embodiment of the present invention, wherein FIGS. 9A, 9B and 9C show different management configurations of remote copy.

DESCRIPTION OF PREFERRED EMBODIMENTS

[Configuration of Information Processing System]

Figure 1:
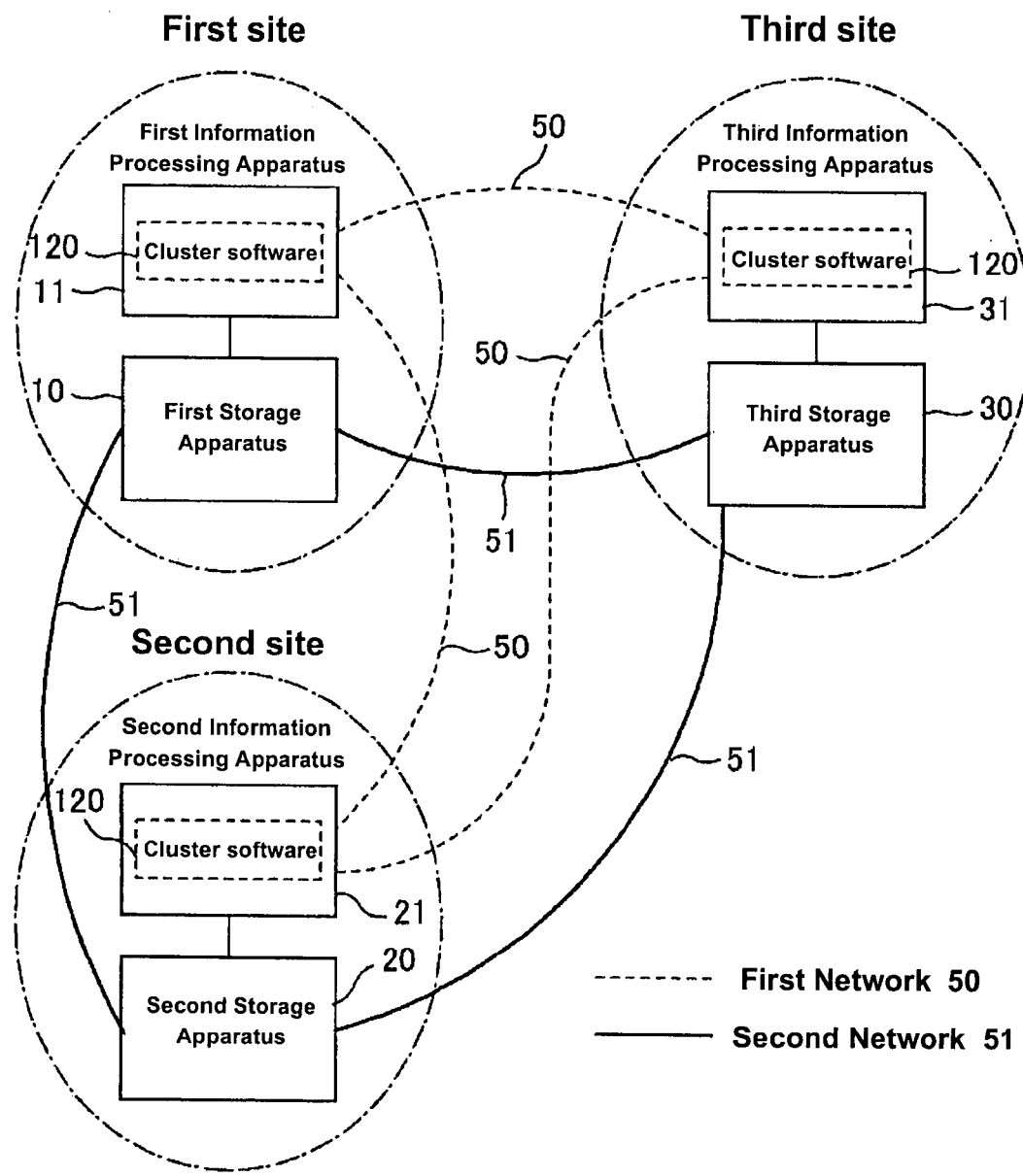
FIG. 1 schematically shows a diagram of an information processing system in accordance with an embodiment of the present invention.

FIG. 1 schematically shows a configuration of an information processing system in accordance with an embodiment of the present invention. The information processing system includes a plurality of storage apparatuses (in this example, three storage apparatuses 10, 20 and 30), each installed at a different site (place), and information processing apparatuses (in this example, information processing apparatuses 11, 21 and 31) that access the storage apparatuses 10, 20 and 30, respectively. More specifically, such sites are, for example, computer facilities operated by organizations such as universities and corporations, as well as data centers at which Web servers on the Internet and ASP (Application Service Provider) are operated. Such information processing systems are constructed to realize disaster recovery in the event of earthquake, fire, hurricane, flood, lightning, terrorism, etc.

On a first site among the three sites are installed a first information processing apparatus 11 and a first storage apparatus 10 that accesses the first information processing apparatus 11. On a second site are installed a second information processing apparatus 21 and a second storage apparatus 20 that accesses the second information processing apparatus 21. On a third site are installed a third information processing apparatus 31 and a third storage apparatus 30 that accesses the third information processing apparatus 31. One combination of the information processing apparatus and the storage apparatus among three combinations of the information processing apparatuses and the storage apparatuses is managed as a primary system, and the other combinations of the information processing apparatuses and the storage apparatuses installed on the other two sites are managed as a backup system for the primary system. In the description below, the site for the primary system is called a "primary site" and the site for the backup system is called a "secondary site."

The information processing apparatus installed on the primary site (hereafter called as a "primary information processing apparatus") and the information processing apparatuses installed on the two secondary sites (hereafter called as "secondary information processing apparatuses") are communicatively connected to one another via a first network 50. The first network 50 may be, for example, WAN that is structured with IP network. It is noted that cluster software (to be described below) that operates on each of the information processing apparatuses can mutually communicate.

In the meantime, the storage apparatus installed on the primary site and the storage apparatuses installed on the secondary sites are communicatively connected to one another via a second network 51. The second network 51 may be, for example, Gigabit Ethernet®, ATM (Asynchronous Transfer Mode), public telephone line, or the like. A network that is faster and has a greater capacity than the first network 50 is normally used as the second network 51 in order to transmit replicated data in a remote copy (to be described below).

<Structure of Apparatus>

The first through third information processing apparatuses 11, 21 and 31 may be computers, each of which is equipped with a CPU (Central Processing Unit), a memory and the like, and may be provided in the form of a personal computer, a work station, a main frame or the like. Each of the information processing apparatuses 11, 21 and 31 may be composed of a plurality of computers that are operatively connected to one another. An operating system operates on each of the first through third information processing apparatuses 11, 21 and 31. Application software is operating on the operating system.

The application software provides, for example, functions of an automatic deposit and payment system for banks or seat reservation system for airlines. Also, cluster software 120 (to be described below) operates on the operating system. The information processing apparatuses 11, 21 and 31 and the storage apparatuses 10, 20 and 30 are connected to one another via a communication means (e.g., a communication line or network). The communication means can, for example, be LAN (Local Area Network), SAN (Storage Area Network), iSCSI (Internet Small Computer System Interface), ESCON (Enterprise System Connection)®, FICON (Fiber Connection)®, ACONARC (Advanced Connection Architecture)®, FIBARC (Fiber Connection Architecture)®.

Figure 2:
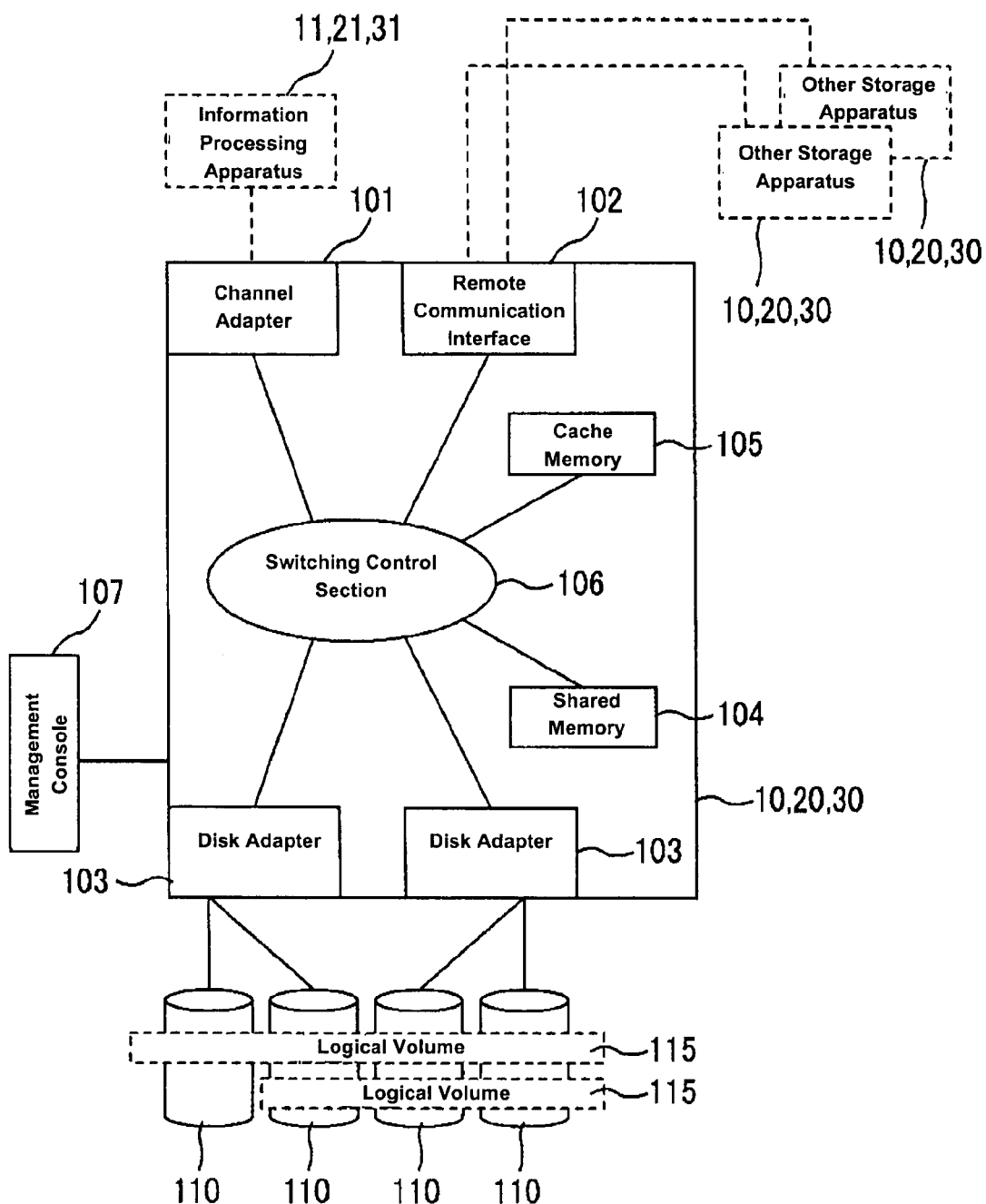
FIG. 2 schematically shows a diagram of a disk array apparatus in accordance with an embodiment of the present invention.

FIG. 2 schematically shows a diagram of a disk array apparatus which will be described as one example of the first through third storage apparatuses 10, 20 and 30 in accordance with an embodiment of the present invention. It is noted that each of the first through third storage apparatuses 10, 20 and 30 may be composed of, for example, a semiconductor storage apparatus, besides a disk array apparatus. The disk array apparatus is typically equipped with a channel adapter 101, a remote communication interface 102, a disk adapter 103, a shared memory 104, a cache memory 105, a switching control section 106 that may be equipped with a cross-bus switch that communicatively connects the devices described above, a management consol 107, and a disk drive 110.

The channel adapter 101 is equipped with a CPU and a memory, and mainly provides a communication function for communicating with an information processing apparatus. The channel adapter 101 receives data I/O requests from the information processing apparatus and writes the data I/O request in the shared memory. Remote copy functions and functions to change management configuration of remote copy in conjunction with failovers, which are described later, are provided as a result of the CPU of the channel adaptor 101 executing programs that realize such functions.

The cache memory 105 is primarily used to temporarily store data sent and received between the channel adaptor 101 and the disk adaptor 103. For example, if a data input/output command received by the channel adaptor 101 from the information processing apparatus is a write command, the channel adaptor 101 writes the write data received from the information processing apparatus in the cache memory 105. The disk adaptor 103 reads the write data from the cache memory 105 and writes the data in the disk drives 110.

The disk adaptor 103 reads data I/O requests written by the channel adaptor 101 in the shared memory 104 and executes processing such as data writing and reading to and from the disk drives 110 according to commands (e.g., SCSI (Small Computer System Interface) standard commands) set in the data I/O requests. The disk adaptor 103 writes data read from the disk drives 110 to the cache memory 105. In addition, the disk adaptor 103 sends data write completion notices and data read completion notices to the channel adaptor 101. The disk adaptor 103 may also be equipped with a function to control the disk drives 110 according to RAID (Redundant Array of Inexpensive Disks) levels (for example, levels 0, 1, 5) stipulated according to what is called the RAID method.

The disk drives 110 are, for example, hard disk drive apparatuses. The disk drives 110 can form a unitary structure with disk array apparatuses or can be separate. Storage regions provided by the disk drives 110 at each site are managed in units of logical volumes 115 that are logically set on the respective storage regions. Reading and writing of data to and from the disk drives 110 can be done by designating an identifier assigned uniquely to each of the logical volumes 115.

The management console 107 is a computer that maintains and manages the disk array apparatus and the disk drives 110. Software and parameters executed on the channel adapter 101 and the disk adapter 103 can be changed by instructions from the management console 107. The management console 107 can be configured to form a unitary structure within the disk array apparatuses or can be separate.

The remote communications interface 102 is a communications interface (i.e., a channel extender) to transfer data with another storage apparatus 10,20 or 30, and the transfer of replication data that takes place in remote copy, described later, takes place via the remote communications interface 102. The remote communications interface 102 converts the interface of the channel adaptor 101 (e.g., ESCON®, FICON® interface) to the communications method of the second network 51. This allows data transfer with another storage apparatus 110,120 or 130 to be realized.

In addition to the configurations described above, the disk array apparatuses can alternatively be apparatuses that function as NAS (Network Attached Storage) that are configured to accept data input/output requests in filename designations from the information processing apparatus according to such protocols as NFS (Network File System), for example.

<Clustering>

The cluster software 120, which realizes the clustering function that is aimed at realizing high availability (HA) among these information processing apparatuses 11, 21 and 31, is operating on each of the first through third information processing apparatuses 11, 21 and 31 operating at the three sites. For example, MSCS (Microsoft Cluster Server)® by Microsoft® may be used as the cluster software 120.

The cluster software 120 provides the failover function in units of the information processing apparatuses 11, 21, 31 installed in the respective sites. The cluster software 120 that operate on the information processing apparatuses 11, 21 and 31 mutually communicate heart beat signals through the first network 50 to thereby monitor operating conditions one another.

When the cluster software 120 operating on the information processing apparatuses 11, 21 and 31 detects a failure (including a network failure) of any one of the information processing apparatuses as a result of an abnormality of the heart beat signal, the operations that are normally performed by the failed information processing apparatus are transferred (failover) to the other information processing apparatuses according to a failover policy set in advance of the time of failure.

Failures that may be detected by the cluster software 120 include hardware failures in the CPU or the memory, and software failures in the operating system, application programs or driver software. At the time of failover, various setting information and resources, such as, for example, the exclusivity of the disk drives 110 and logical volumes 115, and IP addresses, application execution processes, print cues that are allocated to the respective information processing apparatuses 11, 21 and 31 are transferred.

Also, the cluster software 120 provides a function to execute a failover when the user or operator intentionally gives an instruction.

<Remote Copy>

The aforementioned remote copy is conducted between the logical volumes 115 of the storage apparatuses installed on the primary site (hereafter referred to as "primary logical volumes" and "primary storage apparatuses," respectively) and the logical volumes 115 of the storage apparatuses installed on the secondary site (hereafter referred to as "secondary logical volumes" and "secondary storage apparatuses," respectively). When data is written in the primary logical volumes of the primary storage apparatuses which are replication source storage apparatuses, the data is sent from the primary storage apparatuses through the second network 51 to the secondary storage apparatuses which are replication destination storage apparatuses, and the data is also written in the secondary logical volumes by the secondary storage apparatuses. In other words, a remote copy takes place to make contents of counterpart logical volumes consistent. Two storage apparatuses between which a remote copy takes place are called storage apparatuses that form a "pair." Also, the primary logical volumes and the secondary logical volumes between which a remote copy takes place are called logical volumes that form a "pair."

There are synchronous and asynchronous methods for remote copy. In the synchronous method, upon receiving from the information processing apparatus a data I/O request instructing to write data to the primary logical volumes, the primary storage apparatus first write the data to its own primary logical volumes. The primary storage apparatuses also send to the secondary storage apparatuses the same data as they have written to the primary logical volumes. The secondary storage apparatuses write the data received to the secondary logical volumes, and the secondary storage apparatuses sends a notice of completion of the data writing to the primary storage apparatuses. Upon receiving the notice, the primary storage apparatuses send to the information processing apparatus a message notifying that the data writing has been completed.

In this way, according to the synchronous method, the completion notice is sent to the information processing apparatus after it is confirmed that the data has been written to both the primary logical volumes and to the secondary logical volumes. As a result, consistency between contents of the primary logical volumes and contents of the secondary logical volumes is secured when the information processing apparatus receives the completion notice according to the synchronous method. However, the completion notice is not sent to the information processing apparatus until after data writing to the secondary logical volumes is completed. Consequently, the response time in the synchronous method from the time a data I/O request is sent from the information processing apparatus on the primary site to the time a completion notice is sent back to the information processing apparatus is generally longer than in the asynchronous method. If the storage apparatuses are configured to determine that data is written at the time when the data is written in the cache memory 105, the state where "the data is written" also includes a determination of a case where data that is the subject of writing in the disk drives 110 is written in the cache memory 105. On the other hand, according to the asynchronous method, upon receiving from the information processing apparatus a data I/O request instructing a data write to write data to the primary logical volumes, the primary storage apparatuses write the data to the primary logical volumes in response to the request. The primary storage apparatuses also send to the secondary storage apparatuses the same data as they have written. The secondary storage apparatuses write the data received to the secondary logical volumes, and notifies of it to the primary site. Upon writing the data to the primary logical volumes, the primary storage apparatus immediately sends a completion notice to the information processing apparatus regardless of whether the data has been written to the secondary storage apparatuses. As a result, the response time to the information processing apparatus in the asynchronous method is generally shorter than in the synchronous method. However, the consistency of data in the primary logical volumes with data in the secondary logical volumes is not necessarily guaranteed. According to the asynchronous method, data not reflected on the second storage apparatuses is managed in the primary storage apparatus.

<Pair Management Table>

Each of the storage apparatuses 10, 20 and 30 stores a pair management table that registers information relating to the remote copy performed by each of the respective storage apparatuses 10, 20 and 30. The pair management table may be stored in a memory of the channel adapter 101 or the shared memory 104, or the disk drives 110. The pair management table stores information indicating as to whether the storage apparatuses are functioning as the primary apparatuses or the secondary storage apparatuses, in which mode, the synchronous or the asynchronous, the remote copy is performed with the other storage apparatuses, and the like. The remote copy software executed by the channel adapter 101 of each of the storage apparatuses 10, 20 and 30 realizes the remote copy function according to the contents stored in the pair management table.

Figure 3:
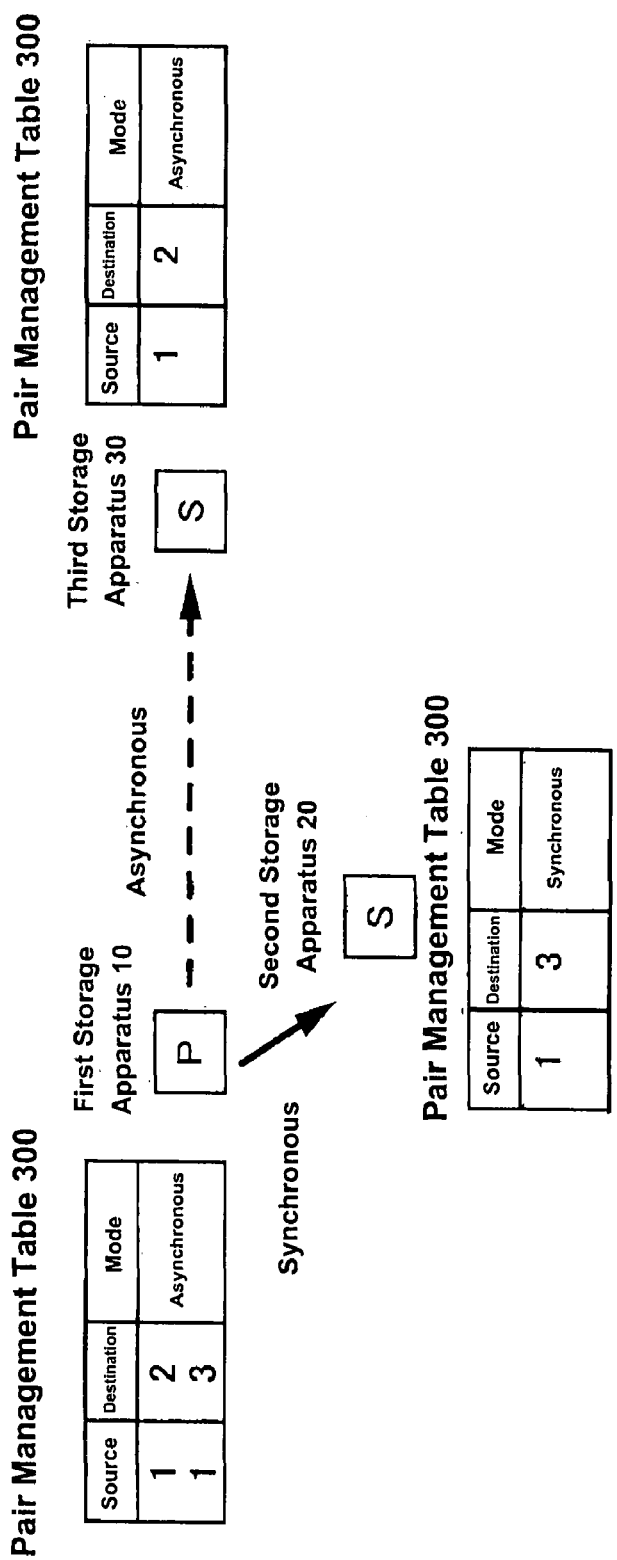
FIG. 3 is a diagram for describing a pair management table in accordance with an embodiment of the present invention.

FIG. 3 shows an example of a pair management table 300 stored in each of the storage apparatuses 10, 20 and 30 where the first cite is set as the primary site, and the second and third sites are set as the secondary sites. The configuration of remote copy in such a setting is stored in each of the pair management tables 300. The pair management table 300 of the first storage apparatus 10 stores information indicating that a remote copy in asynchronous mode is conducted in order to store in the second storage apparatus 20 a replication of the data of the first storage apparatus 10, and a remote copy in synchronous mode is conducted in order to store in the third storage apparatus 30 a replication of the data of the first storage apparatus 10. The pair management table 300 of the second storage apparatus 20 stores information indicating that a remote copy in synchronous mode is conducted in order to store in the third storage apparatus 30 a replication of the data of the first storage apparatus 10. The pair management table 300 of the third storage apparatus 30 stores information indicating that a remote copy in asynchronous mode is conducted in order to store in the second storage apparatus 20 a replication of the data of the first storage apparatus 10.

In the example shown in FIG. 3, the pair management table 300 managed by each of the storage apparatuses 10, 20 and 30 stores only information relating to the storage apparatuses that store the pair management tables 300. However, each of the pair management tables can be structured to register information relating to other storage apparatuses.

<Mode of Remote Copy>

Figure 4A:
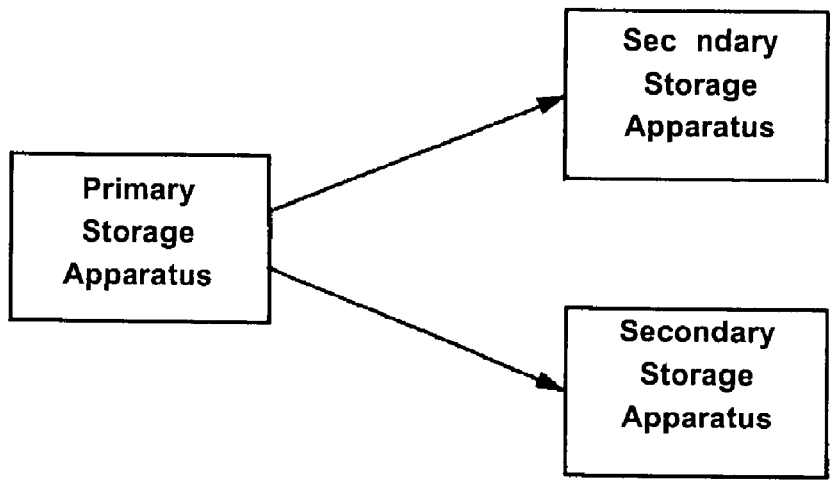
FIG. 4A is a diagram for describing a remote copy operation in a multi-copy mode, and 4B is a diagram for describing a remote copy operation in a multi-hop mode.
Figure 4B:
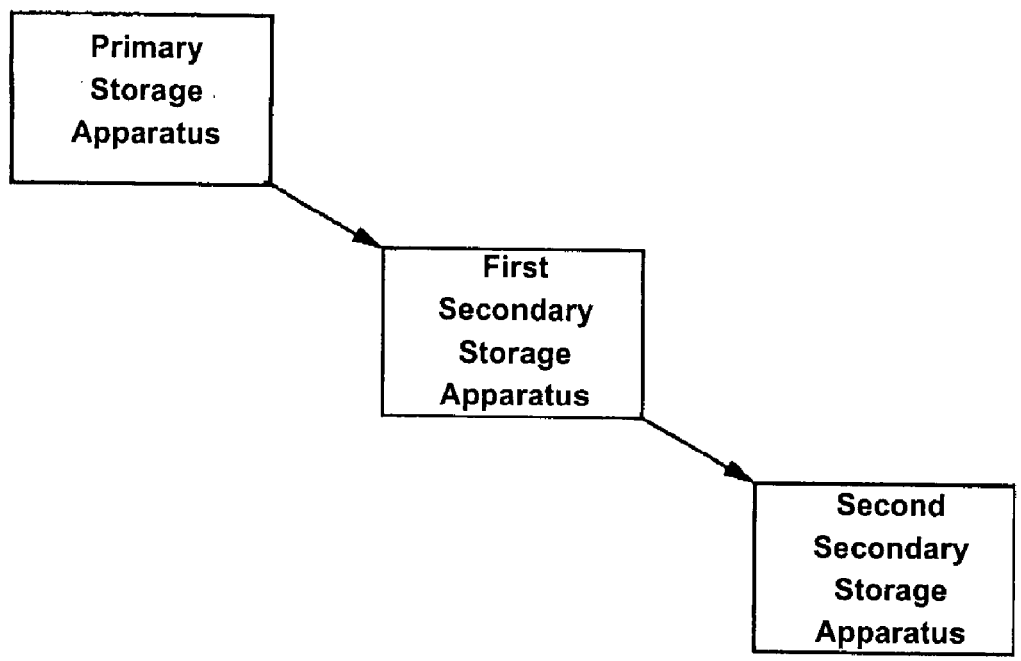

The remote copy conducted among three sites in accordance with an embodiment of the present invention include two modes as indicated in FIGS. 4A and 4B. FIG. 4A indicates a mode in which the primary storage apparatus directly sends data to be replicated (hereafter referred to as "replication data") to the two secondary storage apparatuses (the mode of which is hereafter referred to as a "multi-copy mode"). In the meantime, FIG. 4B indicates a mode in which the primary storage apparatus directly sends replication data to one of the secondary storage apparatuses (hereafter referred to as the "first secondary storage apparatus"), and the primary storage apparatus does not directly send replication data to the other of the secondary storage apparatuses (hereafter referred to as the "second secondary storage apparatus"), but indirectly through the first secondary storage apparatus to the second secondary storage apparatus (the mode of which is hereafter referred to as a "multi-hop mode").

In the multi-hop mode remote copy, the primary storage apparatus sends replication data only to the first secondary storage apparatus, such that the process load of the primary storage apparatus is alleviated compared to the multi-copy mode remote copy. On the other hand, in the multi-hop mode remote copy, if the first secondary storage apparatus stops its function, replication data is not managed at the second secondary storage apparatus any longer. However, in the multi-copy mode remote copy, even when the first secondary storage apparatus stops its function, the management of the replication data at the second secondary storage is continued.

<Operation at the Time of Failover>

Next, mechanisms that automatically change the remote copy management configuration on the storage apparatus side in association with a failover executed on the information processing apparatus side are described with reference to some relevant examples.

<In the Case of Multi-Copy Mode>

Figure 5A:
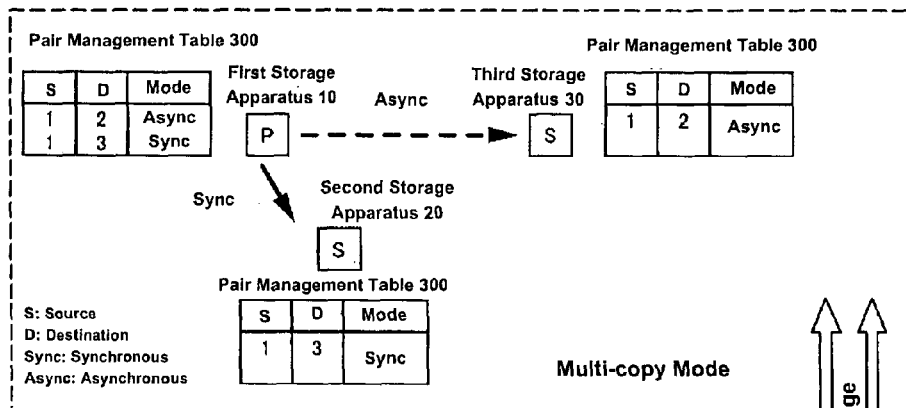
Figure 5B:
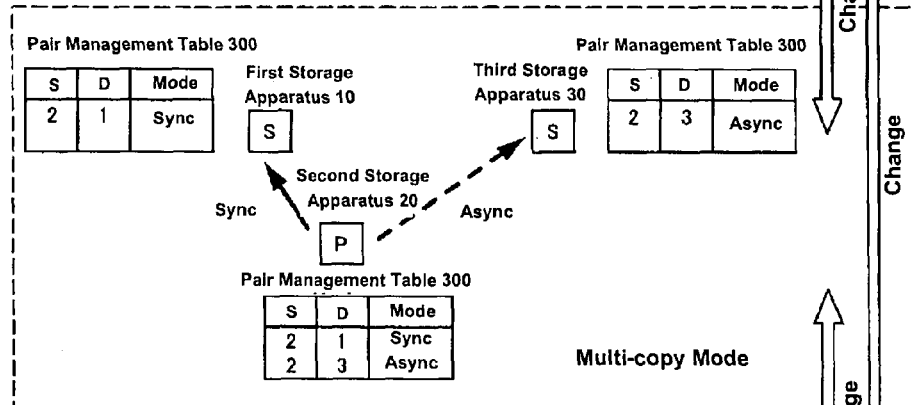
Figure 5C:
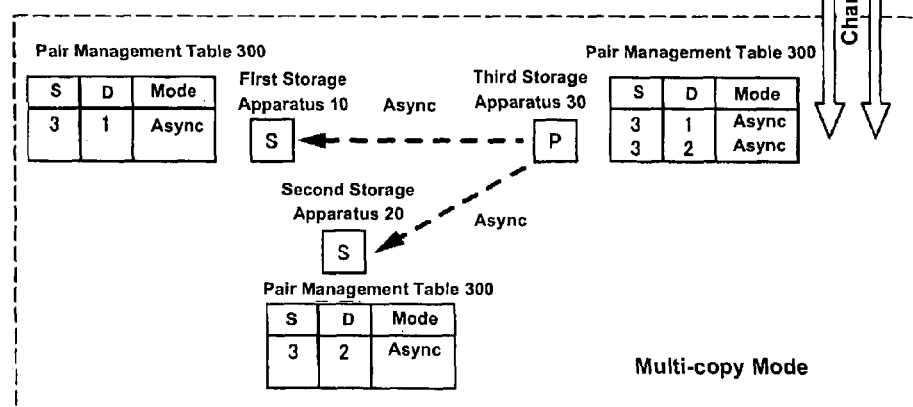

FIGS. 5A, 5B and 5C illustrate management configuration changes that are executed in association with failover operations performed on the information processing apparatus side when a remote copy is conducted in a multi-copy mode among the storage apparatuses on the three sites in accordance with an embodiment of the present invention. FIGS. 5A, 5B and 5C omit illustration of the information processing apparatus. In the embodiment illustrated in FIGS. 5A, 5B and 5C, the remote copy management configuration can be changed between the remote copy modes in FIG. 5A and FIG. 5B, between the remote copy modes in FIG. 5A and FIG. 5C, and between the remote copy modes in FIG. 5B and FIG. 5C. In the figures, the primary storage apparatus is expressed as "P," and the secondary storage apparatuses are expressed as "S." "Synchronous" means that the remote copy between the storage apparatuses is conducted in the synchronous mode. "Asynchronous" means that the remote copy between the storage apparatuses is conducted in the asynchronous mode. In FIGS. 5A, 5B and 5C, the first site and the second site are located in a relatively short distance from each other, such that the remote copy between the first storage apparatus 10 and the second storage apparatus 20 is conducted in "synchronous mode." However, the first site and the third site are located far from each other, and therefore the remote copy between the first storage apparatus 10 and the third storage apparatus 30 is conducted in "asynchronous mode." Also, the second site and the third site are also located far from each other, and the remote copy between the second storage apparatus 20 and the third storage apparatus 30 is conducted in "asynchronous mode."

Figure 6:
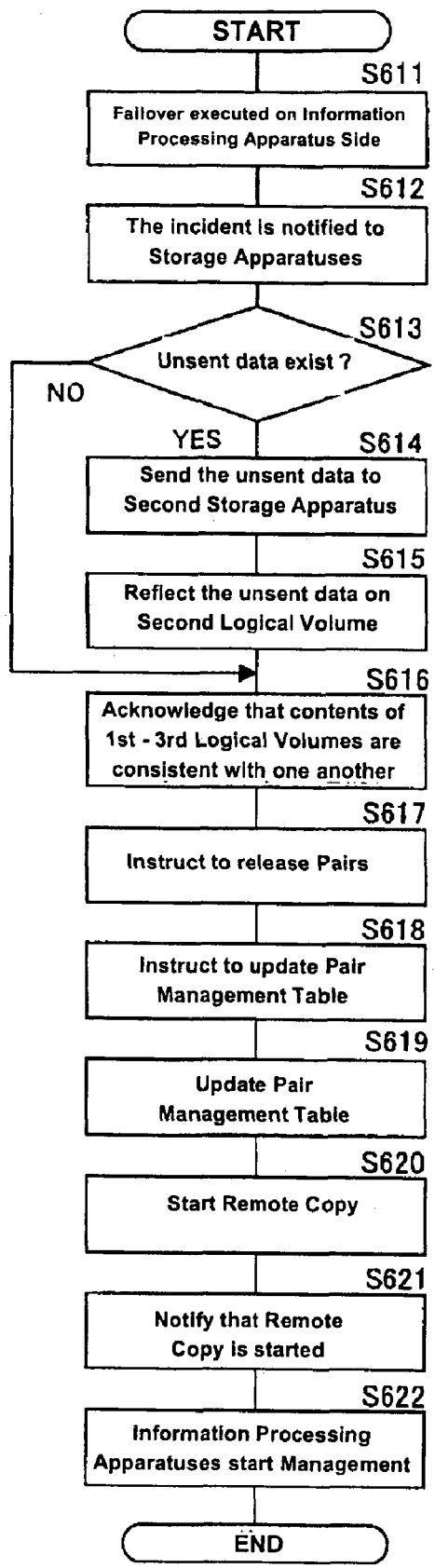
FIG. 6 is a flow chart of a processing that takes place when the remote copy management configuration in FIG. 5A is changed to the remote copy management configuration in FIG. 5B.

The case where the remote copy management configuration indicated in FIG. 5A is changed in association with a failover on the information processing apparatus side to the remote copy management configuration indicated in FIG. 5B is described with reference to a flow chart shown in FIG. 6. When operations of the first information processing apparatus 11 failover to the second information processing apparatus 21 (S611), the cluster software 120 operating on the first through third information processing apparatuses 11, 21 and 31 notify the same to the first through third storage apparatuses 10, 20 and 30 (S612), respectively. More specifically, this notification may be made, when the cluster software 120 is the aforementioned MSCS, for example, through the resource DLL (Dynamic Link Library) detecting shifts of the resources that take place in association with the failover, and the resource DLL notifying the same to the storage apparatuses.

When the failover is caused by a failure of the first information processing apparatus 11, the notification might not be made from the first information processing apparatus 11 to the first storage apparatus 10. In such a case, after the second and the third information processing apparatus 21 and 31 have notified to the second or the third storage apparatus 20 or 30, the notification is sent from the second or the third storage apparatus 20 or 30 through the second network 51 to the first storage apparatus 10. Also, at the time of failover, the first through third information processing apparatuses 11, 21 and 31 stop resources that are to be stopped (hardware resource, software resource) while the remote copy management configuration is changed. By this, data I/O requests are not sent from the information processing apparatus side to the storage apparatus side.

Upon receiving the aforementioned notification, the first through third storage apparatuses 10, 20 and 30 start processings to change the remote copy management configuration from the one shown in FIG. 5A to the one shown in FIG. 5B. The first storage apparatus 10 checks if any data that has not been sent exist in the asynchronous mode remote copy (S613), and if such data exists (Yes in S613), sends the data to the second storage apparatus 20 (S614). Upon receiving the data, the second storage apparatus reflects the same on the second logical volume (S615). By the process described above, the contents of the first through third logical volumes 115 are made consistent with one another. The first through third storage apparatuses 10, 20 and 30 mutually communicate to acknowledge that the contents in the first through third logical volumes 115 are made consistent (S616).

Next, a description is made as to processes that take place from the time when the pair relations of the remote copy configured as indicated in FIG. 5A are released until the time the pair relations configured as indicated in FIG. 5B are generated. To "release" or "generate" the pair relations can mean that the contents of the pair management table 300 stored in each of the storage apparatuses are changed. The release or generation of the pair management table 300 is started when an instruction to release or to generate is given from one of the storage apparatuses that newly becomes a primary storage apparatus to the other storage apparatuses that newly become secondary storage apparatuses through the second network 51.

First, the second storage apparatus 20 that newly becomes a primary storage apparatus sends an instruction to release the pair to the first storage apparatus 10 and the third storage apparatus 30 that newly become secondary storage apparatuses (S617). Next, the second storage apparatus 20 sends to the first storage apparatus 10 and the third storage apparatus 30 an instruction to update the contents of the pair management table 300 to the contents corresponding to those indicated in FIG. 5B (S618).

Then, the second storage apparatus 20 updates the contents of the pair management table 300 it stores itself to contents corresponding to those indicated in FIG. 5B. Also, upon receiving the instruction, the first storage apparatus 10 and the third storage apparatus 30 update the contents of their respective pair management tables 300 they store themselves (S619). Alternatively, release of the pair management table 300 and generation of the new one may be automatically started at each of the storage apparatuses 10, 20 and 30, for example, after each of the storage apparatuses 10, 20 and 30 acknowledges that the contents of the first through third logical volumes are made consistent.

When the contents of the pair management table 300 are updated, the remote copy management in a multi-copy mode indicated in FIG. 5B is started among the first through third storage apparatuses 10, 20 and 30 (S620). As indicated in FIG. 5B, the second storage apparatus 20 function as a primary storage apparatus, and the first and third storage apparatuses 10 and 30 function as secondary storage apparatuses. As the remote copy is started, the same is notified from the second or third storage apparatus 20 or 30 to the cluster software 120 operating on the second or third information processing apparatus 21 or 31 (S621). Upon this notification, the second information processing apparatus 21 starts operations as a primary system, and the third information processing apparatus 31 starts operations as a backup system (S622).

The above is an explanation of the situation where the management configuration indicated in FIG. 5A is changed to the management configuration indicated in FIG. 5B. Similar operations are conducted when the management configuration indicated in FIG. 5B is changed to the management configuration indicated in FIG. 5A, when the management configuration indicated in FIG. 5A is changed to the management configuration indicated in FIG. 5C or vice versa, or when the management configuration indicated in FIG. 5B is changed to the management configuration indicated in FIG. 5C or vice versa.

According to the mechanism described above, when the multi-copy mode is applied, the remote copy management configuration on the storage apparatus side can be automatically changed in association with a failover that takes place on the information processing apparatus side without human intervention.

<In the Case of Multi-Hop Mode>

Figure 7A:
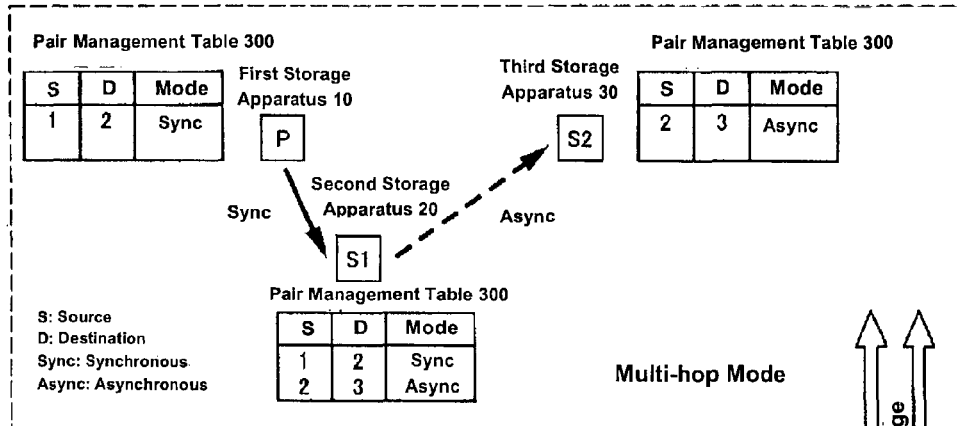
Figure 7B:
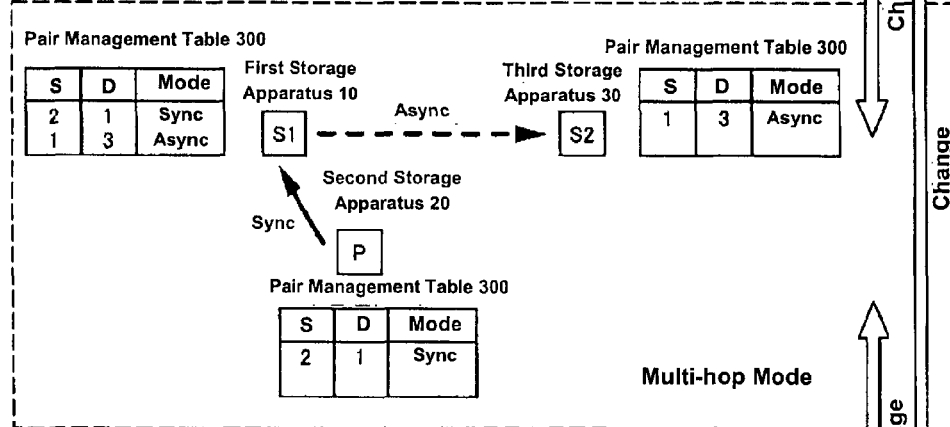
Figure 7C:
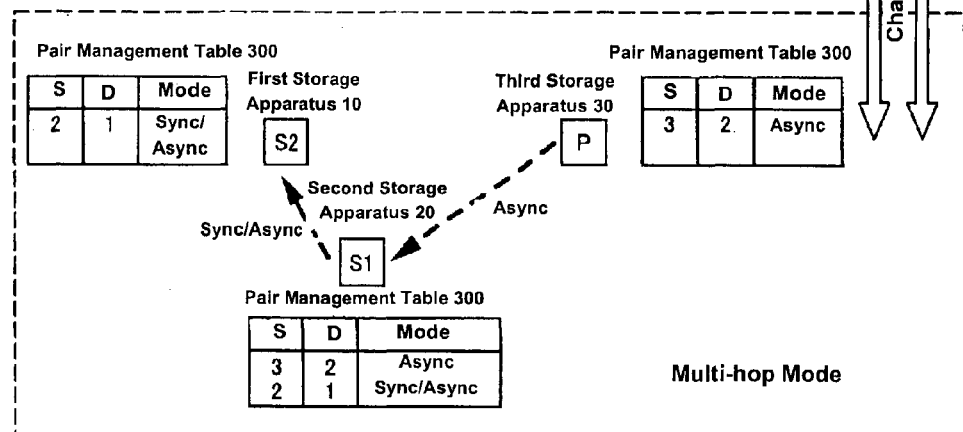

FIGS. 7A, 7B and 7C illustrate management configuration changes that may be executed in association with a failover performed on the information processing apparatus side when a remote copy is conducted in a multi-hop mode among the storage apparatuses on the three sites in accordance with an embodiment of the present invention. FIGS. 7A, 7B and 7C omit illustration of the information processing apparatus. In the embodiment illustrated in FIGS. 7A, 7B and 7C, the remote copy management configuration can be changed between the remote copy modes in FIG. 7A and FIG. 7B, between the remote copy modes in FIG. 7A and FIG. 7C, and between the remote copy modes in FIG. 7B and FIG. 7C. In the figures, the primary storage apparatus is expressed as "P," the first secondary storage apparatus is expressed as "S1," and the second secondary storage apparatus is expressed as "S2."

In FIGS. 7A, 7B and 7C, the first site and the second site are located in a relatively short distance from each other, such that the remote copy between the first storage apparatus 10 and the second storage apparatus 20 may be conducted in "synchronous mode" or "asynchronous mode." However, the first site and the third site are located far from each other, and therefore the remote copy between the first storage apparatus 10 and the third storage apparatus 30 is conducted in "asynchronous mode." Also, the second site and the third site are also located far from each other, and the remote copy between the second storage apparatus 20 and the third storage apparatus 30 is conducted in "asynchronous mode."

Figure 8:
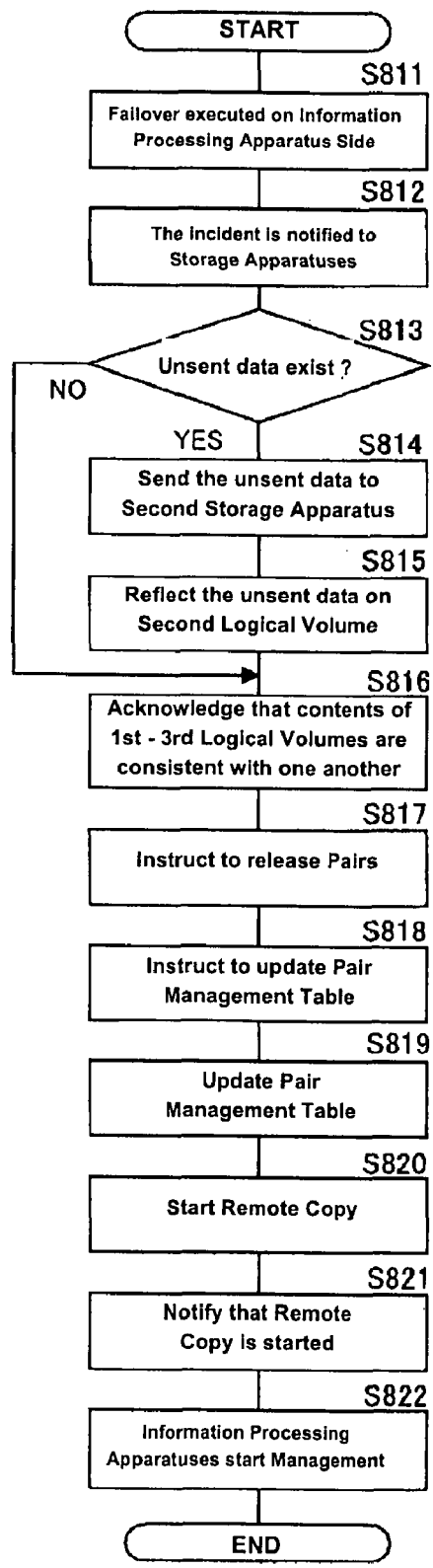
FIG. 8 is a flow chart of a processing that takes place when the remote copy management configuration in FIG. 7A is changed to the remote copy management configuration in FIG. 7B.

The case where the remote copy management configuration indicated in FIG. 7A is changed in association with a failover on the information processing apparatus side to the remote copy management configuration indicated in FIG. 7B is described with reference to a flow chart shown in FIG. 8. When operations of the first information processing apparatus 11 failover to the second information processing apparatus 21 (S811) due to an occurrence of a failure or by an operation of the user interface by an operator, the cluster software 120 operating on the first through third information processing apparatuses 11, 21 and 31 notify the same to the first through third storage apparatuses 10, 20 and 30 (S812), respectively.

Upon receiving the aforementioned notification, the first through third storage apparatuses 10, 20 and 30 start processings to change the remote copy management configuration from the one shown in FIG. 7A to the one shown in FIG. 7B. First, the second storage apparatus 20 checks if any replication data that has not been sent exists in the asynchronous mode remote copy (S813), and if such replication data exists (Yes in S813), sends the data to the third storage apparatus 30 (S814). Upon receiving the data, the third storage apparatus reflects the same on the second logical volume (S815). By the process described above, the contents of the first through third logical volumes are made consistent with one another. The first through third storage apparatuses 10, 20 and 30 mutually communicate to acknowledge that the contents in the first through third logical volumes are made consistent (S816).

Next, a description is made as to processes that take place from the time when the pair relations of the remote copy configured as indicated in FIG. 7A are released until the time the pair relations configured as indicated in FIG. 7B are generated. First, the second storage apparatus 20 that newly becomes a primary storage apparatus sends an instruction to release the pair to the first storage apparatus 10 and the third storage apparatus 30 that newly become secondary storage apparatuses (S817). Next, the second storage apparatus 20 that newly becomes a primary storage apparatus, after having changed the contents of the pair management table 300 it stores itself from the relation corresponding to the one indicated in FIG. 7A to the relation corresponding to the one indicated in FIG. 7B, sends to the first storage apparatus 10 and the third storage apparatus 30 an instruction to update the contents of the pair management table 300 from the one indicated in FIG. 7A to the relation corresponding to the one indicated in FIG. 7B (S818).

In the meantime, upon receiving the notification, the first storage apparatus 10 and the third storage apparatus 30 update the contents of their respective pair management tables 300 they store to contents corresponding to those indicated in FIG. 7B (S819). In addition to the method described above, release of the pair management table 300 and generation of the new one may be automatically started at each of the storage apparatuses 10, 20 and 30, for example, after each of the storage apparatuses 10, 20 and 30 acknowledges that the contents of the first through third logical volumes are made consistent.

When the contents of the pair management table 300 are updated, the remote copy management in a multi-hop mode indicated in FIG. 7B is started among the first through third storage apparatuses 10, 20 and 30 (S820). Also, as the remote copy is started, the same is notified from the second or third storage apparatus 20 or 30 to the cluster software 120 operating on the second and third information processing apparatus 21 and 31 (S821). Upon this notification, the second information processing apparatus 21 starts operations as a primary system, and the third information processing apparatus 31 starts operations as a backup system (S822).

The above is an explanation of the situation where the management configuration indicated in FIG. 7A is changed to the management configuration indicated in FIG. 7B. Similar operations are conducted when the management configuration indicated in FIG. 7B is changed to the management configuration indicated in FIG. 7A, when the management configuration indicated in FIG. 7A is changed to the management configuration indicated in FIG. 7C or vice versa, or when the management configuration indicated in FIG. 7B is changed to the management configuration indicated in FIG. 7C or vice versa.

According to the mechanism described above, when the multi-hop mode is applied, the remote copy management configuration on the storage apparatus side can be automatically changed in association with a failover that takes place on the information processing apparatus side without human intervention.

<When Two Modes Coexist>

Figure 9A:
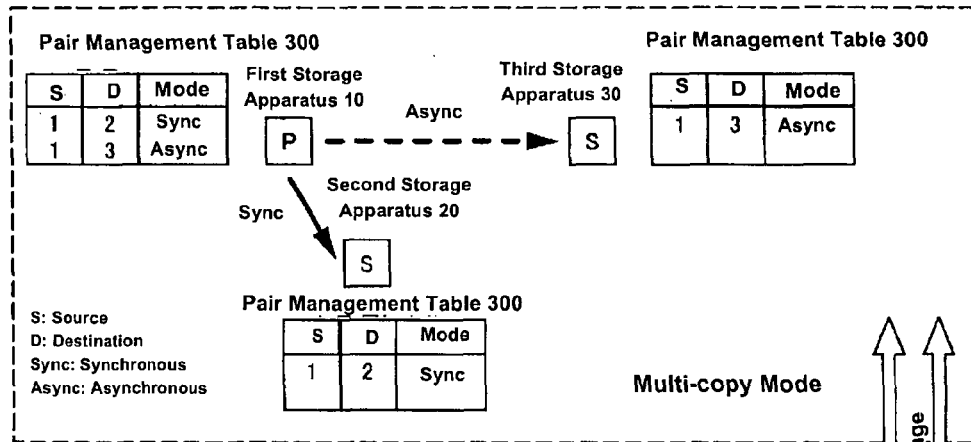
Figure 9B:
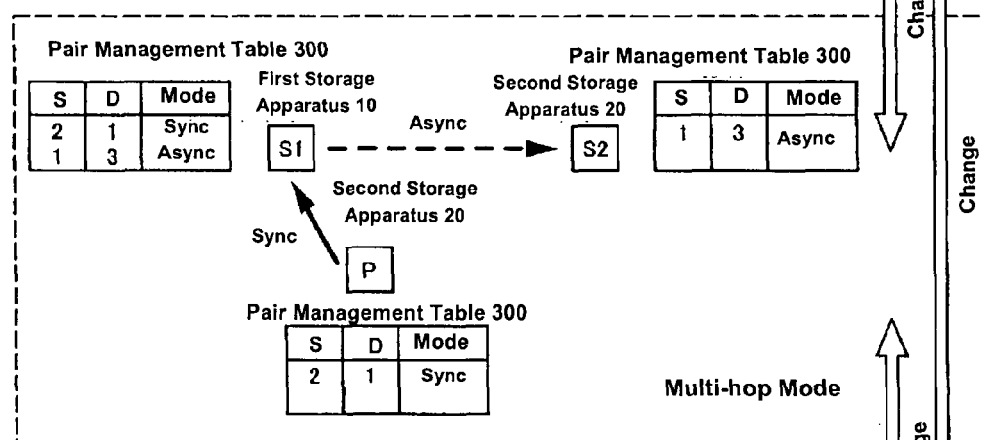
Figure 9C:
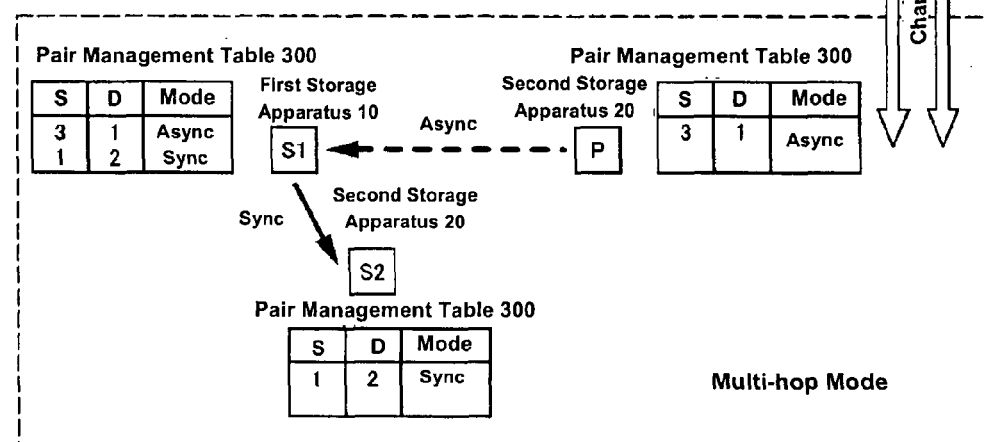

FIGS. 9A, 9B and 9C illustrate management configuration changes that may be automatically executed in association with an execution of a failover when a remote copy is managed in a multi-copy mode or a multi-hop mode among the storage apparatuses on the three sites in accordance with an embodiment of the present invention. FIGS. 9A, 9B and 9C omit illustration of the information processing apparatus. In the embodiment illustrated in FIGS. 9A, 9B and 9C, the remote copy management configuration can be changed between the remote copy modes in FIG. 9A and FIG. 9B, between the remote copy modes in FIG. 9 and FIG. 9C, and between the remote copy modes in FIG. 9B and FIG. 9C.

In FIGS. 9A, 9B and 9C, the first site and the second site are located in a relatively short distance from each other, such that the remote copy between the first storage apparatus 10 and the second storage apparatus 20 is conducted in "synchronous mode." However, the first site and the third site are located far from each other, and therefore the remote copy between the first storage apparatus 10 and the third storage apparatus 30 is conducted in "asynchronous mode." Also, the second site and the third site are also located far from each other, and the remote copy between the second storage apparatus 20 and the third storage apparatus 30 is also conducted in "asynchronous mode."

In the embodiment shown in FIGS. 9A, 9B and 9C, the management configuration may be changed among different modes, such as, for example, form multi-copy mode to multi-hop mode, or from multi-hop mode to multi-copy mode. Also, in any of the management configurations in accordance with the present embodiment, replication data for remote copy is not communicated between the second storage apparatus 20 and the third storage apparatus 30. In other words, the embodiment shown in FIGS. 9A, 9B and 9C can be applied to situations where the second site and the third site are not communicatively connected, or a failure occurs in the communication between the second site and the third site.

In the example shown in FIG. 9A, a remote copy in multi-copy mode is conducted, wherein the first storage apparatus 10 function as a primary storage apparatus "P", and the second and third storage apparatuses 20 and 30 operate as secondary storage apparatuses "S." In the example shown in FIG. 9B, a remote copy in multi-hop mode is conducted, wherein the second storage apparatus 20 functions as a primary storage apparatus "P", and the first storage apparatus 10 functions as a first secondary storage apparatus "S1" and the third storage apparatus 30 functions as a second secondary storage apparatus "S2". In the example shown in FIG. 9C, a remote copy in multi-hop mode is also conducted, wherein the third storage apparatus 30 functions as a primary storage apparatus "P", the first storage apparatus 10 functions as a first secondary storage apparatus "S1" and the third storage apparatus 30 functions as a second secondary storage apparatus "S2."

Figure 10:
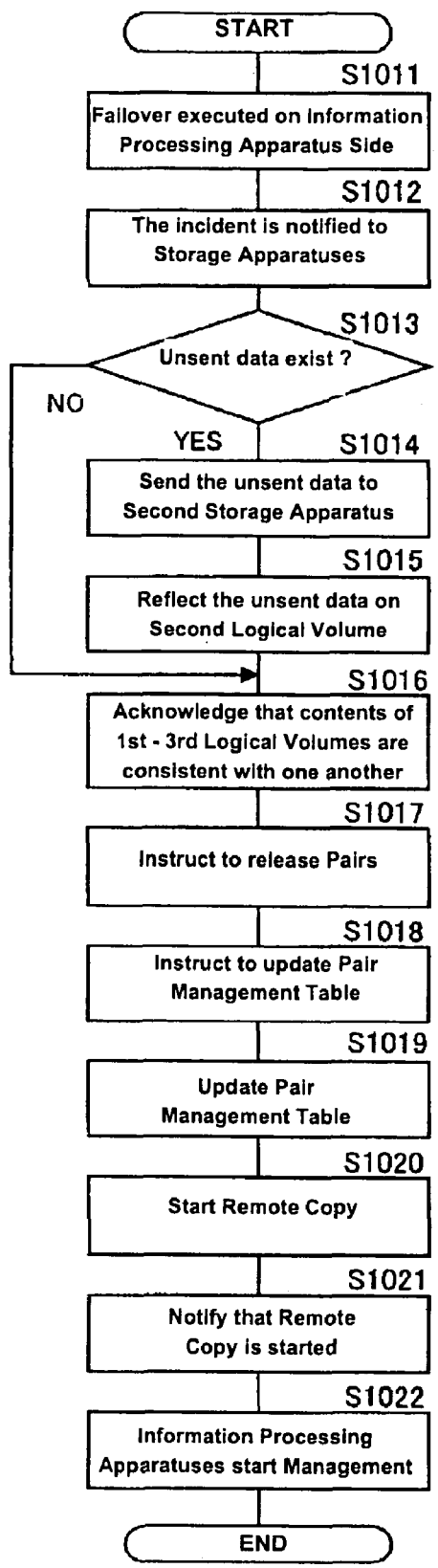
FIG. 10 is a flow chart of a processing that takes place when the remote copy management configuration in FIG. 9A is changed to the remote copy management configuration in FIG. 9B.

The case where the remote copy management configuration indicated in FIG. 9A is changed in association with a failover on the information processing apparatus side to the remote copy management configuration indicated in FIG. 9B is described with reference to a flow chart shown in FIG. 10. When operations of the first information processing apparatus 11 failover to the second information processing apparatus 21 (S1011), the cluster software operating on the first through third information processing apparatuses 11, 21 and 31 notify the same to the first through third storage apparatuses 10, 20 and 30 (S1012), respectively.

Upon receiving the aforementioned notification, the first through third storage apparatuses 10, 20 and 30 start processings to change the remote copy management configuration from the one shown in FIG. 9A to the one shown in FIG. 9B. First, the first storage apparatus 10 checks if any data that has not been sent exists in the asynchronous mode remote copy (S1013), and if such data exists (Yes in S1013), sends the data to the second storage apparatus 20 (S1014). Upon receiving the data, the second storage apparatus reflects the same on the second logical volume (S1015). By the process described above, the contents of the first through third logical volumes are made consistent with one another. The first through third storage apparatuses 10, 20 and 30 mutually communicate to acknowledge that the contents in the first through third logical volumes are made consistent (S1016).

Next, a description is made as to processes that take place from the time when the pair relations of the remote copy configured as indicated in FIG. 9A are released until the time the pair relations configured as indicated in FIG. 9B are generated. First, the second storage apparatus 20 that newly becomes a primary storage apparatus sends an instruction to release the pair to the first storage apparatus 10 and the third storage apparatus 30 that newly become secondary storage apparatuses (S1017). Next, the second storage apparatus 20 that newly becomes a primary storage apparatus, after having changed the contents of the pair management table 300 it stores itself from the relation corresponding to the one indicated in FIG. 9A to the relation corresponding to the one indicated in FIG. 9B, sends to the first storage apparatus 10 and the third storage apparatus 30 an instruction to update the contents of the pair management table 300 from the one indicated in FIG. 9A to the relation corresponding to the one indicated in FIG. 9B (S1018).

In the meantime, upon receiving the notification, the first storage apparatus 10 and the third storage apparatus 30 update the contents of their respective pair management tables 300 they store themselves to contents corresponding to those indicated in FIG. 9B (S1019). In addition to the method described above, release of the pair management table 300 and generation of the new one may be automatically started at each of the storage apparatuses 10, 20 and 30, for example, after each of the storage apparatuses 10, 20 and 30 acknowledges that the contents of the first through third logical volumes are made consistent.

When the contents of the pair management table 300 are updated, the remote copy management in a multi-hop mode indicated in FIG. 9B is started among the first through third storage apparatuses 10, 20 and 30 (S1020). Also, as the remote copy is started, the same is notified to the cluster software 120 operating on the second or third information processing apparatus 21 or 31 (S1021). Upon this notification, the second information processing apparatus 21 starts operations as a primary system, and the third information processing apparatus 31 starts operations as a backup system (S1022).

The above is an explanation of the situation where the management configuration indicated in FIG. 9A is changed to the management configuration indicated in FIG. 9B. Similar operations are conducted when the management configuration indicated in FIG. 9B is changed to the management configuration indicated in FIG. 9A, when the management configuration indicated in FIG. 9A is changed to the management configuration indicated in FIG. 9C or vice versa, or when the management configuration indicated in FIG. 9B is changed to the management configuration indicated in FIG. 9C or vice versa.

According to the mechanism described above, for example, in situations where the second site and the third site are not communicatively connected, or a failure occurs in the communication between the second site and the third site, the remote copy management configuration on the storage apparatus side can be automatically changed in association with a failover that takes place on the information processing apparatus side without human intervention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for controlling an information processing system which includes a first storage apparatus and a first information processing apparatus that accesses the first storage apparatus installed on a first site, a second storage apparatus and a second information processing apparatus that accesses the second storage apparatus installed on a second site, and a third storage apparatus and a third information processing apparatus that accesses the third storage apparatus installed on a third site, the method comprising the steps of:

communicatively connecting the first, second and third information processing apparatuses by a first network;

communicatively connecting at least two pairs of ones of the first, second and third storage apparatuses by a second network;

configuring the first, second and third information processing apparatuses in a cluster for control; and setting one of the first, second and, third storage apparatuses as a replication source storage apparatus, and the other two of the storage apparatuses as replication destination storage apparatuses, wherein said cluster is implemented by cluster software installed in each of said information processing apparatuses, wherein each cluster software installed in each information processing apparatus, being executed by said information processing apparatus, monitors operation of each of said information processing apparatuses, and when a failure occurs in any one of said information processing apparatuses, informs information processing apparatuses other than the failed information processing apparatus and the storage apparatuses of the failure and initiates execution of failover from one of the information processing apparatuses to another one of the information processing apparatuses so that operations normally performed by the failed information processing apparatus are transferred to one of the information processing apparatuses other than the failed information processing apparatuses, wherein, upon receiving a data write request from one of the information processing apparatuses, the replication source storage apparatus stores data, the replication source storage apparatus sends the data to the two replication destination storage apparatuses, and upon receiving the data from the replication source storage apparatus, the two replication destination storage apparatuses store the data, such that a copy of the data stored in the replication source storage apparatus is stored in the two replication destination storage apparatuses, wherein when a failover is executed from one of the first, second and third information processing apparatuses to another of the first, second and third information processing apparatuses, settings of each storage apparatuses as set forth in a management table stored in each of said storage apparatuses are automatically changed such that the replication source storage apparatus is switched to serve as a replication destination storage apparatus and one of the two replication destination storage apparatuses is switched to serve as a replication source storage apparatus, and wherein said settings as set forth in the management table of each of said storage apparatuses indicates whether each of said storage apparatuses is functioning as the replication source storage apparatus or one of the two replication destination storage apparatuses and in which mode, synchronous or asynchronous, of remote copy each of said storage apparatuses is operating with respect to a corresponding storage apparatus.

2. The method for controlling an information processing system according to claim 1, wherein, when the failover is executed from one of the first, second and third information processing apparatuses to another of the first, second and third information processing apparatuses, at least one of the first, second and third information processing apparatuses makes a notification of the failover to one of the first, second and third storage apparatuses which is accessed by the at least one of the first, second and third information processing apparatuses, and the one of the first, second and third storage apparatuses which receives the notification of the failover makes a notification of the failover to other of the storage apparatuses such that each of the first, second and third storage apparatuses executes a process to change the settings.

3. The method for controlling an information processing system according to claim 2, wherein each of the first, second and third storage apparatuses stores information for specifying the storage apparatus that is set as the replication source storage apparatus, and the other two storage apparatuses that are set as the replication destination storage apparatuses, and the process to change the setting includes a process to change the information.

4. The method for controlling an information processing system according to claim 1, wherein the data is directly sent from the storage apparatus that is set as the replication source storage apparatus to the storage apparatuses that are set as the replication destination storage apparatuses.

5. The method for controlling an information processing system according to claim 1, wherein the data is directly sent from the storage apparatus that is set as the replication source storage apparatus to a first one of the storage apparatuses that are set as the replication destination storage apparatuses, and the data is indirectly sent to a second one of the storage apparatuses that are set as the replication destination storage apparatuses through the first one of the storage apparatuses that are set as the replication destination storage apparatuses.

6. The method for controlling an information processing system according to claim 1, wherein, upon automatically changing the settings,
a control in which the data is directly sent from the storage apparatus that is set as the replication source storage apparatus to the storage apparatuses that are set as the replication destination storage apparatuses is changed to a control in which the data is directly sent from the storage apparatus that is set as the replication source storage apparatus to a first one of the storage apparatuses that are set as the replication destination storage apparatuses, and the data is indirectly sent to a second one of the storage apparatuses that are set as the replication destination storage apparatuses through the first one of the storage apparatuses that are set as the replication destination storage apparatuses.

7. The method for controlling an information processing system according to claim 1, wherein the storage apparatus that is set as the replication source storage apparatus sends to the information processing apparatus a completion notification for the data write request after confirming that the data has been written in the storage apparatuses that are set as the replication destination storage apparatuses.

8. The method for controlling an information processing system according to claim 1, wherein the storage apparatus that is set as the replication source storage apparatus sends to the information processing apparatus a completion notification for the data write request regardless of whether or not the data has been written in the storage apparatuses that are set as the replication destination storage apparatuses.

9. The method for controlling an information processing system according to claim 1, wherein a data storage region of each of the first, second and third storage apparatuses is managed in units of logical volumes that are logically set on the data storage region, and the logical volumes of the storage apparatus that is set as the replication source storage apparatus are associates with the logical volumes of each of the storage apparatuses that are set as the replication destination storage apparatuses, wherein the control to store the copy of the data that is stored in the storage apparatus that is set as the replication source storage apparatus in the other two storage apparatuses that are set as the replication destination storage apparatuses is conducted through making contents of the correlated logical volumes consistent with one another.

10. An information processing system comprising:
a first storage apparatus and a first information processing apparatus that accesses the first storage apparatus installed on a first site;
a second storage apparatus and a second information processing apparatus that accesses the second storage apparatus installed on a second site;
a third storage apparatus and a third information processing apparatus that accesses the third storage apparatus installed on a third site;
a module that communicatively connects the first, second and third information processing apparatuses by a first network, communicatively connects at least two pairs of ones of the first, second and third storage apparatuses by a second network, and manages the first, second and third information processing apparatuses configured in a cluster;
a module that sets one of the first, second and third storage apparatuses as a replication source storage apparatus, and the other two of the storage apparatuses as replication destination storage apparatuses,
wherein said cluster is implemented by cluster software installed in each of said information processing apparatuses,
wherein each cluster software installed in each information processing apparatus, being executed by said information processing apparatus, monitors operation of each of said information processing apparatuses, and when a failure occurs in any one of said information processing apparatuses, informs information processing apparatuses other than the failed information processing apparatus and the storage apparatuses of the failure and initiates execution of failover from one of the information processing apparatuses to another one of the information processing apparatuses so that operations normally performed by the failed information processing apparatus are transferred to one of the information processing apparatuses other than the failed information processing apparatuses,
a module that performs a control such that, upon receiving a data write request from one of the information processing apparatuses, the replication source storage apparatus stores data, the replication source storage apparatus sends the data to the two replication destination storage apparatuses, and upon receiving the data from the replication source storage apparatus, the two replication destination storage apparatuses store the data, such that a copy of the data stored in the replication source storage apparatus is stored in the two replication destination storage apparatuses; and
a module that performs a control such that, when a failover is executed from one of the first, second and third information processing apparatuses to another of the first, second and third information processing apparatuses, settings of each storage apparatus as set forth in the management table stored in each of said storage apparatuses are automatically changed such that the replication source storage apparatus is switched to serve as a replication destination storage apparatus and one of the two replication destination storage apparatuses is switched to serve as a replication source storage apparatus,
wherein said settings as set forth in the management table of said of said storage apparatuses indicates whether each of said storage apparatuses is functioning as the replication source storage apparatus or one of the two replication destination storage apparatuses and in which mode, synchronous or asynchronous, of remote copy each of said storage apparatuses is operating with respect to a corresponding storage apparatus.

11. The information processing system according to claim 10, wherein, when the failover is executed, at least one of the first, second and third information processing apparatuses makes a notification of the failover to one of the first, second and third storage apparatuses which is accessed by the at least one of the first, second and third information processing apparatuses, and the one of the first, second and third storage apparatuses which receives the notification of the failover makes a notification of the failover to other of the storage apparatuses such that each of the first, second and third storage apparatuses executes a process to change the settings.

12. The information processing system according to claim 11, wherein each of the first, second and third storage apparatuses stores information for specifying the storage apparatus that is set as the replication source storage apparatus, and the other two storage apparatuses that are set as the replication destination storage apparatuses, and the process to change the setting includes a process to change the information.

13. The information processing system according to claim 10, wherein the data is directly sent from the storage apparatus that is set as the replication source storage apparatus to the storage apparatuses that are set as the replication destination storage apparatuses.

14. The information processing system according to claim 10, wherein the data is directly sent from the storage apparatus that is set as the replication source storage apparatus to a first one of the storage apparatuses that are set as the replication destination storage apparatuses, and the data is indirectly sent to a second one of the storage apparatuses that are set as the replication destination storage apparatuses through the first one of the storage apparatuses that are set as the replication destination storage apparatuses.

15. The information processing system according to claim 10, further comprising a control module that, upon automatically changing the settings, switches a control in which the data is directly sent from the storage apparatus that is set as the replication source storage apparatus to the storage apparatuses that are set as the replication destination storage apparatuses to a control in which the data is directly sent from the storage apparatus that is set as the replication source storage apparatus to a first one of the storage apparatuses that are set as the replication destination storage apparatuses, and the data is indirectly sent to a second one of the storage apparatuses that are set as the replication destination storage apparatuses through the first one of the storage apparatuses that are set as the replication destination storage apparatuses.

16. The information processing system according to claim 10, wherein the storage apparatus that is set as the replication source storage apparatus sends to the information processing apparatus a completion notification for the data write request after confirming that the data has been written in the storage apparatuses that are set as the replication destination storage apparatuses.

17. The information processing system according to claim 10, wherein the storage apparatus that is set as the replication source storage apparatus sends to the information processing apparatus a completion notification for the data write request regardless of whether or not the data has been written in the storage apparatuses that are set as the replication destination storage apparatuses.

18. The information processing system according to claim 10, wherein a data storage region of each of the first, second and third storage apparatuses is managed in units of logical volumes that are logically set on the data storage region, and the logical volumes of the storage apparatus that is set as the replication source storage apparatus are associates with the logical volumes of each of the storage apparatuses that are set as the replication destination storage apparatuses, wherein the control to store the copy of the data that is stored in the storage apparatus that is set as the replication source storage apparatus in the other two storage apparatuses that are set as the replication destination storage apparatuses is conducted through making contents of the correlated logical volumes consistent with one another.

19. A program stored on a storage medium for operating an information processing system which includes:
 a first storage apparatus and a first information processing apparatus that accesses the first storage apparatus installed on a first site;
 a second storage apparatus and a second information processing apparatus that accesses the second storage apparatus installed on a second site;
 a third storage apparatus and a third information processing apparatus that accesses the third storage apparatus installed on a third site;
 a module that communicatively connects the first, second and third information processing apparatuses by a first network, communicatively connects at least two pairs of ones of the first, second and third storage apparatuses by a second network, and manages the first, second and third information processing apparatuses configured in a cluster;
 a module that sets one of the first, second and third storage apparatuses as a replication source storage apparatus, and the other two of the storage apparatuses as replication destination storage apparatuses,
 wherein said cluster is implemented by cluster software installed in each of said information processing apparatuses,
 wherein each cluster software installed in each information processing apparatus, being executed by said information processing apparatus, monitors operation of each of said information processing apparatuses, and when a failure occurs in any one of said information processing apparatuses, informs information processing apparatuses other than the failed information processing apparatus and the storage apparatuses of the failure and initiates execution of failover from one of the information processing apparatuses to another one of the information processing apparatuses so that operations normally performed by the failed information processing apparatus are transferred to one of the information processing apparatuses other than the failed information processing apparatuses,
 a module that performs a control such that, upon receiving a data write request from one of the information processing apparatuses, the replication source storage apparatus stores data, the replication source storage apparatus sends the data to the two replication destination storage apparatuses, and upon receiving the data from the replication source storage apparatus, the two replication destination storage apparatuses store the data, such that a copy of the data stored in the replication source storage apparatus is stored in the two replication destination storage apparatuses,
 a module that performs a control such that, when a failover is executed from one of the first, second and third information processing apparatuses to another of the first, second and third information processing apparatuses, settings of each storage apparatus as set forth in a management table stored in each of said storage apparatuses are automatically changed such that the replication source storage apparatus is switched to serve as a replication destination storage apparatus and one of the two replication destination storage apparatuses is switched to serve as a replication source storage apparatus, the program when executed causes said information processing system to perform the steps of:

when the failover is executed, a allowing at least one of the first, second and third information processing apparatuses to make a notification of the failover to one of the first, second and third storage apparatuses which is accessed by the at least one of the first, second and third information processing apparatuses, wherein said settings as set forth in the management table of said of said storage apparatuses indicates whether said each of said storage apparatuses is functioning as the replication source storage apparatus or one of the two replication destination storage apparatuses and in which mode, synchronous or asynchronous, of remote copy each of said storage apparatuses is operating with respect to a corresponding storage apparatus.

20. The program for operating an Information processing system according to claim 19, wherein the one of the first, second and third storage apparatuses which receives the notification of the failover makes a notification of the failover to other of the storage apparatuses such that each of the first, second and third storage apparatuses executes a process to change the settings.

21. An information processing system comprising:

three storage apparatuses installed on three sites;

three information processing apparatuses that are accessible to the three storage apparatuses, respectively, and that are configured in a cluster, wherein said cluster is implemented by cluster software installed in each of said information processing apparatuses, wherein each cluster software installed in each information processing apparatus, being executed by said information processing apparatus, monitors operation of each of said information processing apparatuses, and when a failure occurs in any one of said information processing apparatuses, informs information processing apparatuses other than the failed information processing apparatus and the storage apparatuses of the failure and initiates execution of failover from one of the information processing apparatuses to another one of the processing apparatuses so that operations normally performed by the failed information processing apparatus are transferred to one of the information processing apparatuses other than the failed information processing apparatuses, wherein one of the storage apparatuses is set as a replication source and the other two of the storage apparatuses are set as replication destinations, and the two storage apparatuses that are set as the replication destinations manage a copy of data stored in the storage apparatus that is set as the replication source, wherein, in association with an execution of a failover among the information processing apparatuses, settings of each storage apparatuses as set forth in a management table stored in each of said storage apparatuses are automatically changed such that the storage apparatus that is set as the replication source functions as a replication destination, and one of the storage apparatuses that are set as the replication destinations functions as a replication source, wherein said settings as set forth in the management table of each of said storage apparatuses indicates whether each of said storage apparatuses is functioning as the replication source storage apparatus or one of the two replication destination storage apparatuses and in which mode, synchronous or asynchronous, of remote copy each of said storage apparatuses is operating with respect to a corresponding storage apparatus.

* * * * *